US010007363B2

(12) United States Patent
Chung et al.

(10) Patent No.: US 10,007,363 B2
(45) Date of Patent: Jun. 26, 2018

(54) PEN-TYPED NAVIGATION DEVICE AND RELATED NAVIGATION MODULE (71) Applicant: PixArt Imaging Inc., Hsin-Chu (TW)

(72) Inventors: Ching-Lin Chung, Hsin-Chu (TW); Chia-Fu Ke, Hsin-Chu (TW); Jr-Shen Yang, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 36 days.

(21) Appl. No.: 15/164,899

(22) Filed: May 26, 2016

(65) Prior Publication Data
US 2017/0277285 A1    Sep. 28, 2017

(30) Foreign Application Priority Data

Mar. 28, 2016 (TW) .............................. 105109768 A (51) Int. Cl.
*G06F 3/0354* (2013.01)
*G06F 3/041* (2006.01)
*G06F 3/042* (2006.01)

(52) U.S. Cl.
CPC .......... *G06F 3/03545* (2013.01); *G06F 3/042* (2013.01); *G06F 3/0414* (2013.01)

(58) Field of Classification Search
CPC ..... G06F 3/03545; G06F 3/0414; G06F 3/042
USPC .............................. 345/179; 178/19.01–19.07
See application file for complete search history.

(56) References Cited

U.S. PATENT DOCUMENTS

| 2002/0118181 | A1* | 8/2002 | Sekendur | G06F 3/0325 345/179 |
| 2004/0136083 | A1* | 7/2004 | Wang | G06F 3/0317 359/642 |
| 2009/0183929 | A1* | 7/2009 | Zhang | G06F 3/03545 178/18.01 |
| 2010/0033432 | A1* | 2/2010 | Sutton | G06F 1/3203 345/167 |
| 2010/0194547 | A1* | 8/2010 | Terrell | G06F 3/016 340/407.2 |
| 2012/0206330 | A1* | 8/2012 | Cao | G06F 3/0383 345/156 |
| 2014/0062942 | A1* | 3/2014 | Ho | G06F 3/03545 345/174 |
| 2015/0153851 | A1* | 6/2015 | Knepper | G06F 3/03545 345/179 |
| 2016/0048224 | A1* | 2/2016 | Brunet | G06F 3/03545 345/174 |
| 2017/0008332 | A1* | 1/2017 | Mattis | B43K 29/00 |

* cited by examiner

*Primary Examiner* — Stephen G Sherman
(74) *Attorney, Agent, or Firm* — Winston Hsu (57) ABSTRACT A pen-typed navigation device includes a housing, a pen tip, a pressure detecting unit, and a navigation module having an optical large depth of field detecting unit and a processing unit. The pen tip is disposed on the housing. The pressure detecting unit is disposed on the pen tip to detect a pressure of the pen tip applied to a working plane. The optical large depth of field detecting unit is disposed by the pen tip and has a specific range about the depth of field, and can detect movement information of the pen tip relative to the working plane while a distance between the pen tip and the working plane is smaller than the foresaid specific range. The processing unit is adapted to acquire navigation information generated by the pen tip according to detection result of the pressure detecting unit and the optical large depth of field detecting unit.

22 Claims, 5 Drawing Sheets

PEN-TYPED NAVIGATION DEVICE AND RELATED NAVIGATION MODULE

BACKGROUND OF THE INVENTION

1. Field of the Invention

The present invention relates to an optical navigation device, and more particularly, to a pen-typed navigation device with optical detecting function and a related navigation module.

2. Description of the Prior Art

A conventional optical navigation device can be manufactured as the optical mouse, the optical touch pad or the optical touch ball. The switches on the mouse housing are the left key and the right key of the optical mouse, and the roller under the mouse housing is utilized to output a control command different from commands of the left key and the right key. While the optical mouse moves onto a working surface, the optical detector disposed on a bottom of the mouse housing analyzes position variation of characteristics on the working surface, and navigation information of the optical mouse is transformed accordingly, which means a cursor trace displayed on the computer screen represents motion of the conventional optical mouse. Due to structural design constraint of the mouse, it is difficult to write a neat and tidy letter on the computer screen by handling the conventional optical mouse.

SUMMARY OF THE INVENTION

The present invention provides a pen-typed navigation device with optical detecting function and a related navigation module for solving above drawbacks.

According to the claimed invention, a pen-typed navigation device includes a housing, a pen tip, a pressure detecting unit, a large depth of field (DOF) optical detecting unit and a processing unit. The pen tip is disposed on an end of the housing. The pressure detecting unit is disposed on the pen tip and adapted to detect pressure of the pen tip applied to a working surface. The large DOF optical detecting unit is disposed by the pen tip and has a specific depth of field (DOE) imaging range, and is further adapted to detect movement information of the pen tip relative to the working surface while a distance between the pen tip and the working surface is smaller than the specific DOF imaging range. The processing unit is electrically connected to the pressure detecting unit and the large DOF optical detecting unit, and is further adapted to acquire navigation information generated by the pen tip according to detection results of the pressure detecting unit and the large DOF optical detecting unit.

According to the claimed invention, a navigation module for actuating a navigating function according to a command includes a large DOF optical detecting unit and a processing unit. The large DOE optical detecting unit has a specific depth of field (DOE) imaging range, and is adapted to detect movement information of the large DOF optical detecting unit relative to a working surface while a distance between the large DOE optical detecting unit and the working surface is smaller than the specific DOF imaging range. The processing unit is electrically connected to the large DOF optical detecting unit, and adapted to acquire navigation information according to detection results of the large DOF optical detecting unit.

According to the claimed invention, the specific DOF imaging range is larger than or equal to one centimeter, the large DOF optical detecting unit is actuated to detect the movement information while the pen tip actually touches the working surface or the pen tip is suspended above the working surface. A view range of the large DOF optical detecting unit covers the working surface simply, or covers the pen tip and the working surface simultaneously. The processing unit is adapted to determine whether the pen tip or the large DOF optical detecting unit is moved or inclined relative to the working surface according to the detection result of the large DOF optical detecting unit.

The pen-typed navigation device of the present invention utilizes the pressure detecting unit to detect pressure variation of the pen tip, and further drives the large DOF optical detecting unit to detect the movement of the pen tip for optical navigation efficacy. The large DOF optical detecting unit can accurately recognize relative position variation between strokes while writing the letter, so as to provide excellent writing experience in comparison with the conventional optical navigation mouse. The pen-typed navigation device of the present invention which optionally includes the directional light source, the movement detecting unit and the vibration generating unit can be utilized as the briefing pen with the force feedback function, the paint container and/or the writing core are auxiliaries to aid the realistic writing function. Comparing to the prior art, such as the conventional laser baton or the conventional ballpoint pen, the pen-typed navigation device of the present invention has preferred market competition due to multifunctional application.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
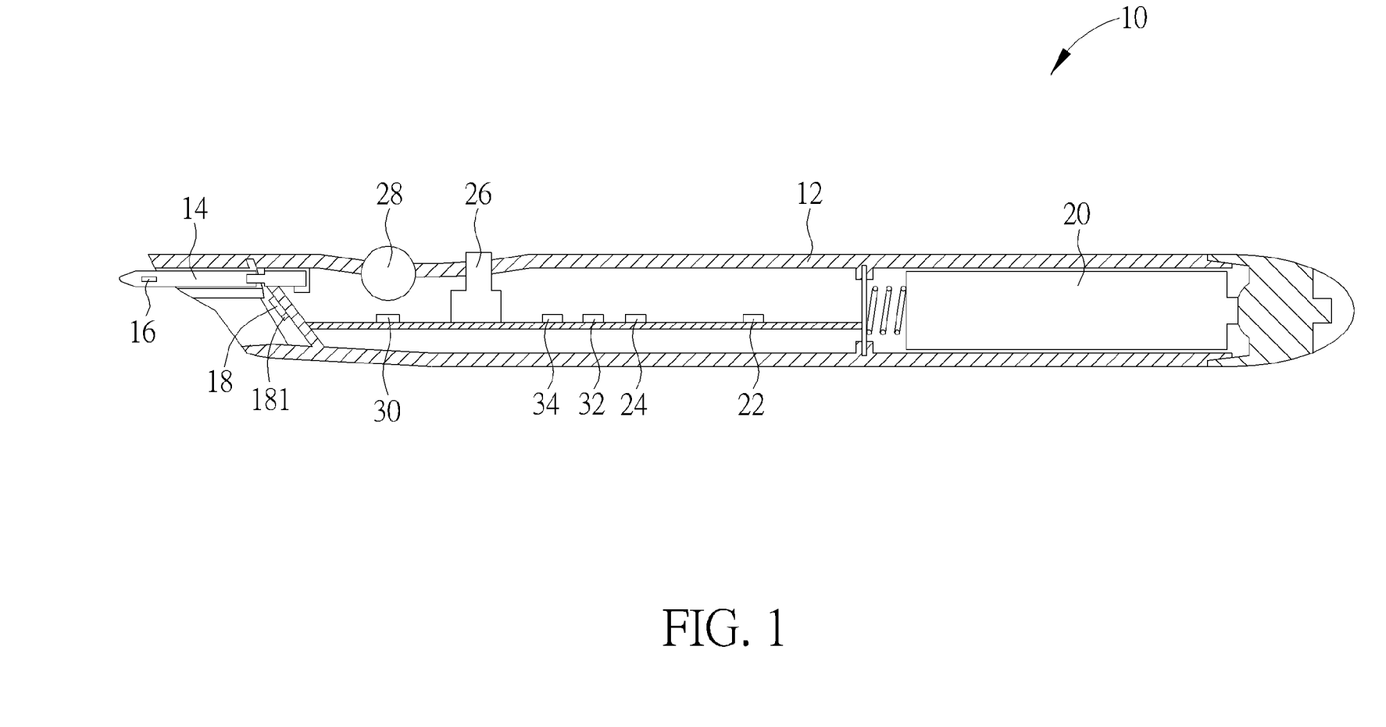
FIG. 1 is a diagram of a pen-typed navigation device according to a first embodiment of the present invention.

Please refer to FIG. 1. FIG. 1 is a diagram of a pen-typed navigation device 10 according to a first embodiment of the present invention. The pen-typed navigation device 10 includes a housing 12, a pen tip 14, a pressure detecting unit 16, a large depth of field (DOF) optical detecting unit 18, an energy supplying unit 20, a memory unit 22 and a processing unit 24. The pen tip 14 is disposed on an end of the housing 12, and the pressure detecting unit 16 is disposed on the pen tip 14. When the user handles the pen-typed navigation device 10 to write a symbol or paint a line, the pressure detecting unit 16 detects pressure of the pen tip 14 applied to a working surface. The working surface can be the paper, the desktop or any useful platform. The large DOF optical detecting unit 18 is disposed by the pen tip 14 and has a specific depth of field (DOF) imaging range. In the first embodiment, the specific DOF imaging range preferably can be larger than or equal to 1 centimeter, and the large DOF optical detecting unit 18 can immediately detect movement information of the pen tip 14 relative to the working surface while a distance between the pen tip 14 and the working surface is smaller than the specific DOF imaging range. It is to say, the large DOF optical detecting unit 18 is actuated to detect the movement information while the pen tip 14 actually touches the working surface, or while the pen tip 14 is suspended above the working surface and the foresaid distance is smaller than the specific DOF imaging range.

The large DOF optical detecting unit 18 is detachably disposed by the pen tip 14; for instance, the large DOF optical detecting unit 18 can be connected with a circuit board inside the housing 12 via a golden finger terminal. In a general writing purpose, the pen-typed navigation device 10 having the large DOF optical detecting unit 18 with low resolution can be utilized to writing; in an advanced painting purpose, the large DOF optical detecting unit 18 with high resolution can be installed on the pen-typed navigation device 10 for painting an exquisite pattern. The large DOF optical detecting unit 18 of the pen-typed navigation device 10 can be replaced according to operation intention or upgrading demand.

The large DOF optical detecting unit 18 can be assembled with the processing unit 24 to form an independent navigation module. In addition to the said pen-typed navigation device, the navigation module further can be applied to any navigation product and able to generate navigation information while the navigation product is slightly spaced from the working surface. Navigation function of the navigation module is actuated via a command. In the embodiment of the present invention, the command can be a control signal from the processing unit to switch the large DOF optical detecting unit 18 into a startup mode or a shut-down mode. Further, the command can be set according to a detection result of the pressure detecting unit 16; for example, an imaging function of the large DOF optical detecting unit 18 can be started up or shutdown in accordance with a comparison of the detected pressure datum to a threshold. Application of the command is not limited to the above-mentioned embodiment, which depends on actual demand.

The large DOF optical detecting unit 18 can adjust a light emitting angle of a light source 181, and the maximum light emitting angle is equal to 120 degrees. A view range of the large DOF optical detecting unit 18 may simply covers the working surface, or simultaneously covers the working surface and the pen tip 14. While the view range merely contains the working surface, the large DOF optical detecting unit 18 determines the relative movement information of the pen tip 14 according to characteristic formed on the working surface. While the view range contains the working surface and the pen tip 14 altogether, the large DOF optical detecting unit 18 determines a movement or an inclination of the pen-typed navigation device 10 according to distance variation between the pen tip 14 and the characteristic on the working surface; for example, the pen tip 14 is represented as moving over the working surface on condition that a distance between the pen tip 14 and the characteristic on the image captured by the large DOF optical detecting unit 18 is varied, the pen tip 14 is further represented as standing upon but being inclined to the working surface on condition that the distance between the pen tip 14 and the characteristic on the image is not varied and content of the said image is changed. Moreover, the large DOF optical detecting unit 18 can read a shadow of the pen tip 14 projected onto the working surface, and determine whether the pen tip 14 actually touches the working surface or the pen tip 14 is suspended above the working surface, or determine whether the pen tip 14 is inclined toward the working surface according to dimensions variation of the said shadow.

In the first embodiment of the present invention, the pressure detecting unit 16 has an activated mode and a non-activated mode. The pressure detecting unit 16 and the large DOF optical detecting unit 18 are dormant while the pressure detecting unit 16 is switched into the non-activated mode, and energy consumption of the pen-typed navigation device 10 is economized accordingly. The pressure detecting unit 16 is switched into the activated mode while the pressure detecting unit 16 contacts against the working surface, and the large DOF optical detecting unit 18 is actuated to detect the movement information of the pen tip 14 relative to the working surface. While the distance between the pen tip 14 and the working surface is smaller than the specific DOF imaging range, the large DOF optical detecting unit 18 may be automatically switched into the activated mode to detect the movement information of the pen tip 14. The pressure detecting unit 16 has at least two switchable modes, such as the foresaid activated mode and the foresaid non-activated mode. The activated mode may have a function of detecting quantity variation of the pressure applied to the working surface by the pen tip 14, a width of the line painted by the pen-typed navigation device 10 and showed on the computer screen can be adjusted according to the pressure quantity variation.

Except for switching the pressure detecting unit 16 between the activated mode and the non-activated mode while the pen tip 14 touching the working surface is detected, is should be mentioned that the pressure detecting unit 16 further can be set as a change-over switch by means of clicking the pen tip 14 onto the working surface (which means the pressure detecting unit 16 detects an instant pressure variation); for instance, the change-over switch may be represented as the left key or the right key of the optical mouse (the pen-typed navigation device 10), or the change-over switch may be utilized to actuate a specific application program of an external computer device connected with the pen-typed navigation device 10. Besides, the pressure detecting unit 16 switched into the activated mode can detect the pressure quantity variation applied to the pen tip 14, which means a force exerted upon the pen-typed navigation device 10 in a slight manner or in a heavy manner is recognizable, and the pen-typed navigation device 10 outputs a corresponding control command in accordance with the pressure quantity variation to actuate the application program of the external computer device. The user can set several control commands which respectively correspond to different situations, the said situations can be results of determine whether the pressure is generated or determine quantity of the generated pressure. The control commands may be defined by the pen-typed navigation device 10 in advance.

The pressure detecting unit 16, the large DOE optical detecting unit 18, the energy supplying unit 20 and the memory unit 22 are electrically connected to the processing unit 24. The energy supplying unit 20 is detachably disposed inside the housing 12, so the user can remove the energy supplying unit 20 to avoid energy dissipation while the pen-typed navigation device 10 is packed up. The energy supplying unit 20 collects and stores energy optionally by wireless charge technique or wire charge technique, and other electronic components of the pen-typed navigation device 10 can be charged via the energy supplying unit 20. The processing unit 24 acquires the navigation information generated from the pen tip 14 in accordance with detection results of the pressure detecting unit 16 and the large DOF optical detecting unit 18, the corresponding symbol and/or lines are then displayed on the computer screen. A datum related to the navigation information is stored inside the memory unit 22. The processing unit 24 utilizes the related datum to execute inertia analysis of the navigation information, such as detecting a gesture applied toward the pen-typed navigation device 10, and the pen-typed navigation device 10 can be used as a baton or a briefing pen.

The pen-typed navigation device 10 further includes a keyswitch unit 26, a roller unit 28 and a roller detecting unit 30. The keyswitch unit 26 is electrically connected to the processing unit 24, and a part of the keyswitch unit 26 protrudes from the housing 12. An amount and an arrangement of the keyswitch unit 26 are not limited to the embodiment shown in FIG. 1, which depend on design demand. The keyswitch unit 26 is a manual switch of the pen-typed navigation device 10; for example, the keyswitch unit 26 can be the left key and/or the right key while the pen-typed navigation device 10 is utilized as the optical mouse, or the keyswitch unit 26 can be a functional switch while the pen-typed navigation device 10 is utilized as the briefing pen. Application of the keyswitch unit 26 is not limited as the above-mentioned embodiment. The roller unit 28 is disposed on the housing 12 and can be designed similar to wheel form or sphere form. The wheel-formed roller unit 28 is handled by one dimensional operation, which means the uniaxial rolling direction, and the sphere-formed roller unit 28 is handled by two-dimensional operation, which means the multi-axis rolling direction. The roller detecting unit 30 is electrically connected to the processing unit 24, and adapted to detect motion of the roller unit 28 preferably via an optical detecting function so as to trigger the control command (such as the page turning command) different from the navigation information.

The pen-typed navigation device 10 selectively includes a movement detecting unit 32 and a vibration generating unit 34. The vibration generating unit 34 is electrically connected to the movement detecting unit 32, and the movement detecting unit 32 is electrically connected to the processing unit 24. The movement detecting unit 32 detects acceleration variation of the housing 12 while the pen-typed navigation device 10 is exerted. The processing unit 24 analyzes the detected acceleration variation of the housing 12, and determines to execute a specific application program of the external computer device or drive the vibration generating unit 34 to generate vibration feedback toward the housing 12 in accordance with the analyzed acceleration variation, so as to provide particular operation feeling or the vibration reminder accordingly. In the embodiment shown in FIG. 1, the processing unit 24 is disposed on the circuit board inside the housing 12; however, the processing unit 24 further can be assembled with the large DOF optical detecting unit 18 to form the independent navigation module (not shown in figures), and the navigation module may be embedded in the circuit board to connect with other electronic components of the pen-typed navigation device 10.

Figure 2:
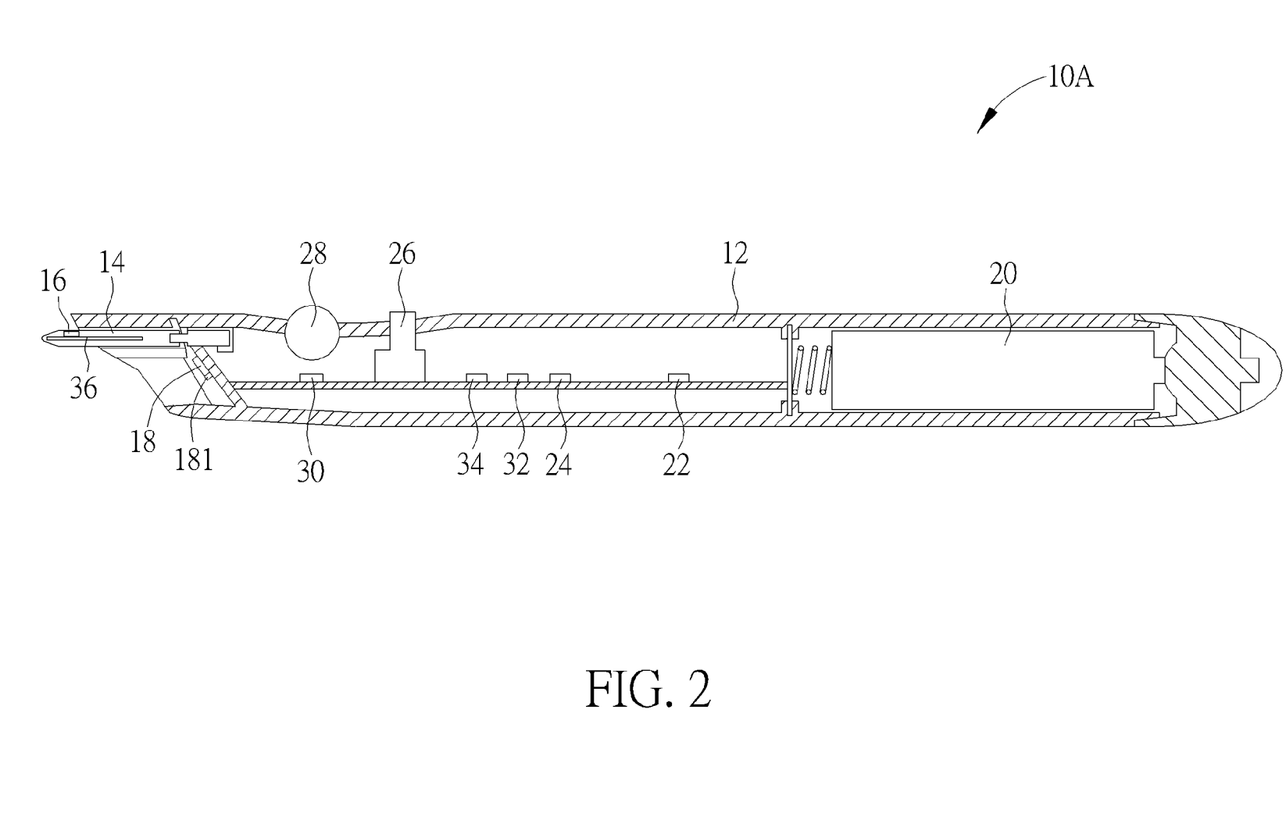
FIG. 2 is a diagram of the pen-typed navigation device according to a second embodiment of the present invention.
Figure 3:
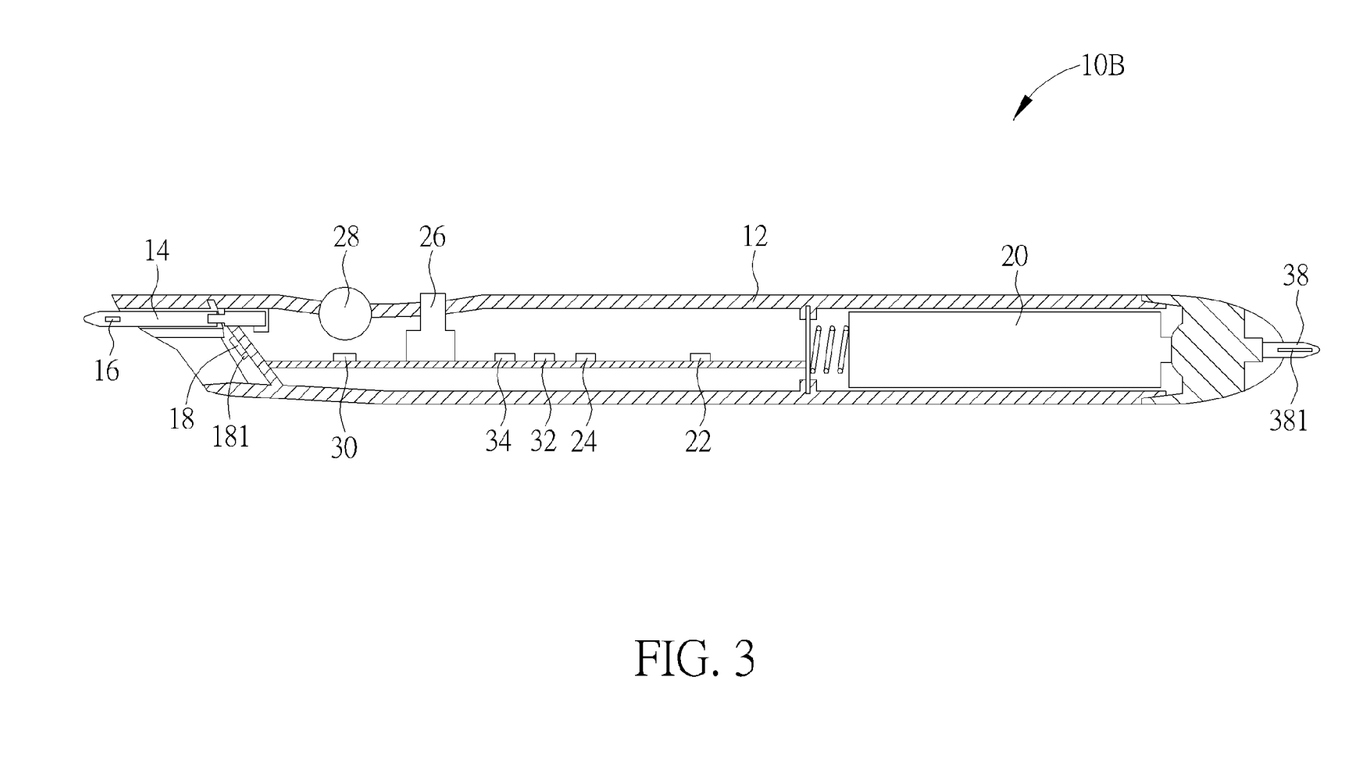
FIG. 3 is a diagram of the pen-typed navigation device according to a third embodiment of the present invention.

Please refer to FIG. 2 and FIG. 3. FIG. 2 is a diagram of the pen-typed navigation device 10A according to a second embodiment of the present invention. FIG. 3 is a diagram of the pen-typed navigation device 10B according to a third embodiment of the present invention. In addition to drawing the virtual symbol and lines by the pressure detecting unit 16 and the large DOF optical detecting unit 18, the pen-typed navigation device 10A further can make a paint container 36 on the pen tip 14. The paint container 36 contains ink, and the pen-typed navigation device 10A can be utilized to write the realistic symbol and/or paint the realistic line on the paper by the paint container 36 of the pen tip 14. The ink inside the paint container 36 is released via a changeover switch (not shown in figures), the user controls the changeover switch to decide whether the pen-typed navigation device 10A is utilized to write via the ink or to read the navigation information via the large DOF optical detecting unit 18. Further, the pen-typed navigation device 10B disposes a writing core 38 on the other end of the housing 12 opposite to the pen tip 14. The paint container 381 of the writing core 38 is utilized to write the realistic symbol and/or paint the realistic line, so that the user can overturn the pen-typed navigation device 10B to alternatively execute the realistic writing function or the virtual navigation function.

Figure 4:
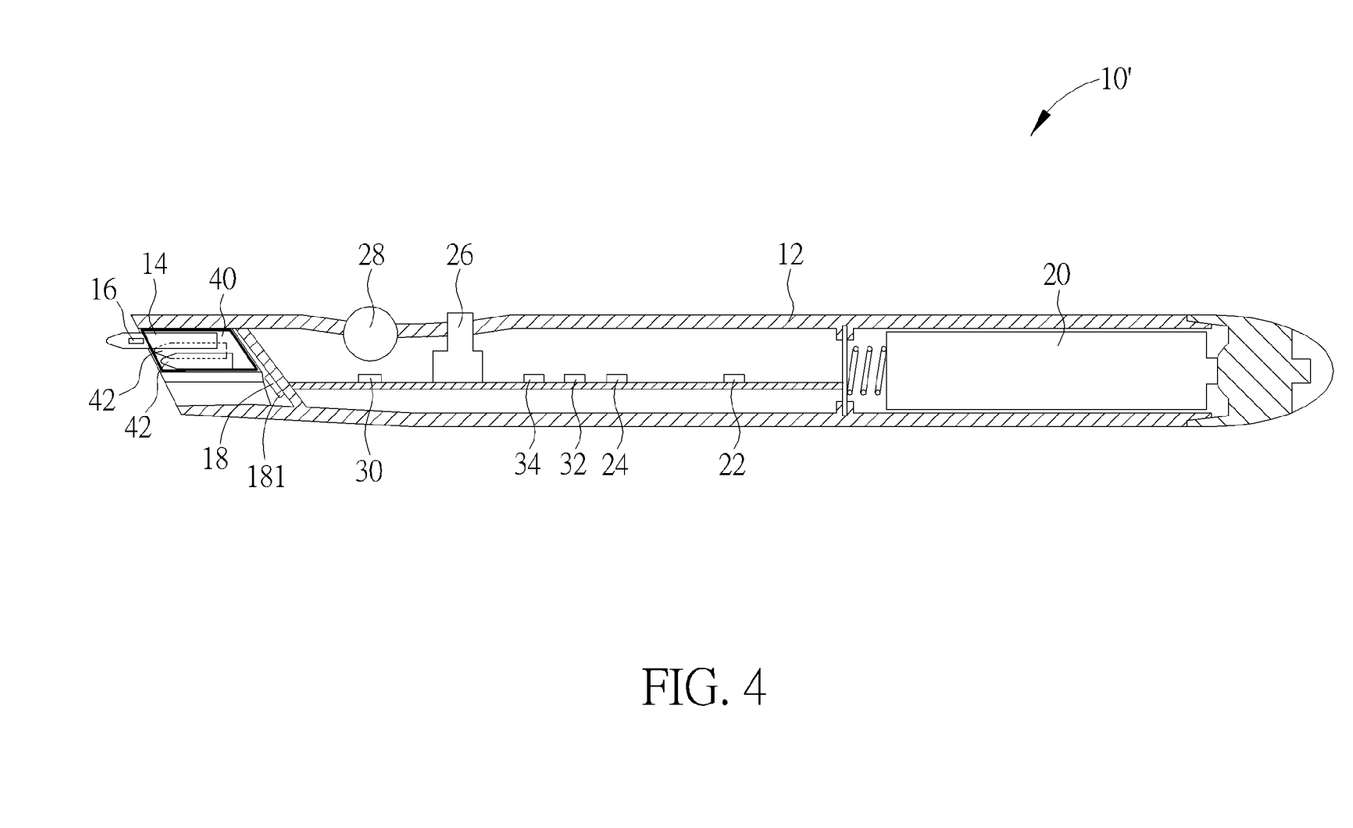
FIG. 4 is a diagram of the pen-typed navigation device according to a fourth embodiment of the present invention.

Please refer to FIG. 4. FIG. 4 is a diagram of the pen-typed navigation device 10' according to a fourth embodiment of the present invention. The pen-typed navigation device 10' includes a removable mechanism 40 disposed inside the housing 12. The pen tip 14 and one or more writing cores 42 are installed on the removable mechanism 40, the paint container of each writing core 42 respectively contains the ink with individual color. While the virtual navigation function of the pen-typed navigation device 10' is executed, the writing core 42 is hidden inside the housing 12 and the pen tip 14 is moved out of the housing 12 by the removable mechanism 40; while the realistic writing function of the pen-typed navigation device 10' is executed, the pen tip 14 is hidden inside and the writing core 42 containing the specific color ink is moved out of the housing 12 by the removable mechanism 40.

Figure 5:
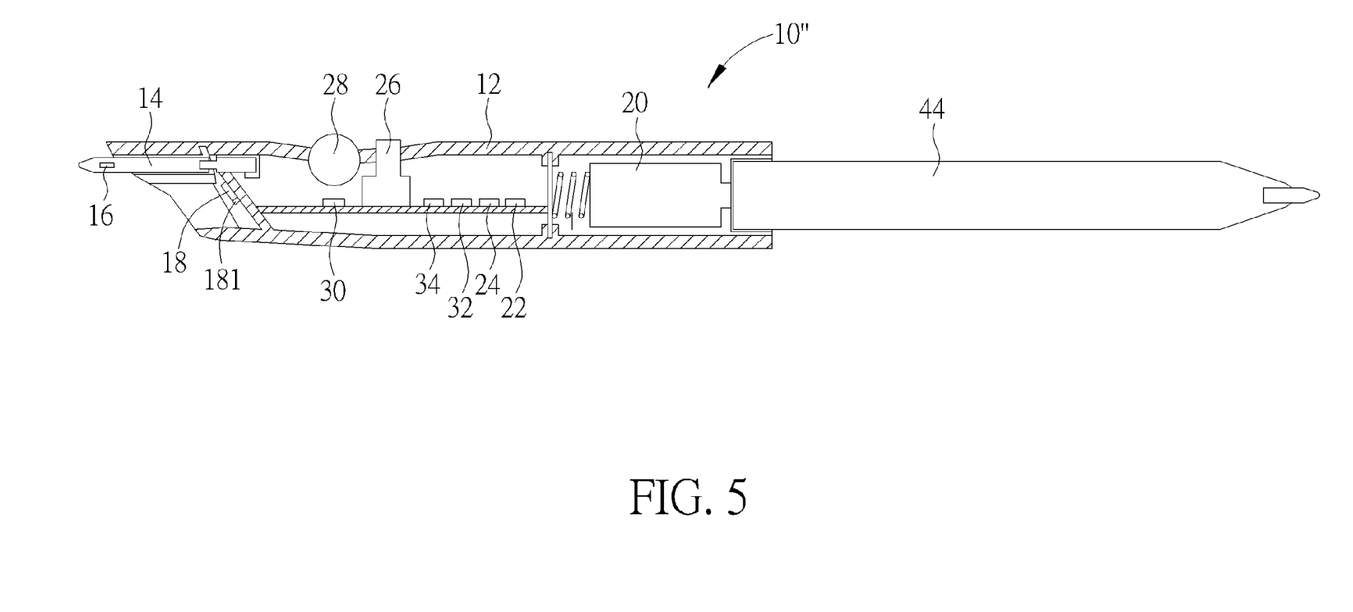
FIG. 5 is a diagram of the pen-typed navigation device according to fifth embodiment of the present invention.

Please refer to FIG. 5. FIG. 5 is a diagram of the pen-typed navigation device 10" according to fifth embodiment of the present invention. The pen-typed navigation device 10" can be freely assembled with and disassembled from the pen-typed object 44, and the pen-typed object 44 is an ink pen. The housing 12 of the pen-typed navigation device 10" is a sheath. The pen tip 14, the pressure detecting unit 16 and the large DOF optical detecting unit 18 are disposed on an end of the sheath, and the other end of the sheath is utilized to assemble with the pen-typed object 44. The pen-typed object 44 is applied to write the realistic symbol and/or to paint the realistic line on the paper by the ink, the user may dispose the pen-typed navigation device 10" on the pen-typed object 44 and then utilize the pen-typed navigation device 10" to draw the virtual symbol and/or lines, and the said virtual symbol and/or lines are displayed on the computer screen accordingly.

In the embodiments of the present invention, the pen tip 14 may have a capacitive touch unit (not shown in figures) and the capacitive touch unit is executed to supply an active capacitive touch function or an inactive capacitive touch function. The pen tip 14 with the capacitive touch unit is moved over the corresponding working surface to draw a trace, and the navigation information about the trace is read via the capacitive touch function; in the meantime, the large DOF optical detecting unit 18 is an auxiliary unit to detect an inclination angle of the pen tip 14 relative to the working surface.

As shown in FIGS. 1-5, the housing of the foresaid pen-typed navigation device is a tube-typed structure. The tube-typed structure can be a circular tube, a triangular tube, or any polygonal tubes. A radial dimension of the tube-typed structure is preferably, but not limited to, ranged between 0.3~1.5 cm (centimeter), which depends on sizes and amounts of the pressure detecting unit, the large DOF optical detecting unit and the writing core. Since the pen-typed navigation device includes the writing core, a length of the tube-typed structure is preferably, but not limited to, ranged between 8~20 cm (centimeter); since the pen-typed navigation device is the sheath detachably disposed on the pen-typed object, the length of the tube-typed structure can be a smaller one accordingly. A shape and dimensions of the housing are designed to match the palm of adult, teen and child, so that the user with any ages and any types of build can comfortably hold the pen-typed navigation device to execute the realistic writing function and the virtual navigation function.

The pen-typed navigation device of the present invention preferably possesses the pressure detecting unit and the large DOF optical detecting unit. The pressure detecting unit is at least switched between the activated mode and the non-activated mode, and the pressure detecting unit is switched into the activated mode while detecting the pen tip pressing over the working surface, so as to control a cursor movement of the pen-typed navigation device on the computer screen; meanwhile, the large DOF optical detecting unit captures the image to acquire characteristic variation on the working surface, and the navigation information of the pen tip moved on the working surface is analyzed by the processing unit. In the present invention, the DOF imaging range of the large DOF optical detecting unit is greater than or equal to 1 centimeter. The large DOF optical detecting unit detects the movement trace of the pen tip and outputs the corresponding navigation information while the pen tip actually touches the working surface. In an application of drawing the virtual symbol or lines by the pen-typed navigation device, the pen-typed navigation device may be slight lifted up between different strokes while writing letters (which means the pen tip does not touch the working surface, and the distance between the pen tip and the working surface is smaller than the specific DOF imaging range), and the large DOF optical detecting unit can continuously detect the navigation information of the pen tip even though the pen tip is spaced from the working surface, so that the pen-typed navigation device provides preferred writing experience in the application of drawing the virtual symbol or lines.

In an application of drawing patterns by the pen-typed navigation device, the movement track of the pen tip that is slightly spaced from the working surface (which represents the distance between the pen tip and the working surface is smaller than the specific DOF imaging range) can be defined as a drawing sketch. The user may handle the pen-typed navigation device suspended in midair to simulate the sketch patterns, and several drawing sketches are stored in the memory unit. Since the user selects one of the drawing sketches, the selected drawing sketch can be viewed as a final form and other drawing sketches may be abandoned or preserved optionally. The pen tip still can actually touch the working surface to add extra print over the selected drawing sketch.

The pen-typed navigation device stores the navigation information about the letter, the symbol, the line and the pattern into the memory unit. The processing unit may analyze the related datum of the navigation information to record writing custom of the user while the pen-typed navigation device is in the sleep mode, and the setting of the pen-typed navigation device can be adjusted accordingly for preferred operation experience. For example, the letter drawn by the pen-typed navigation device is determined as being inclined toward the right aspect via the inertia analysis of the navigation information, the user should be a righty, and parameter setting of the pen-typed navigation device is adjusted in terms of the righty custom for acquiring the precise navigation information. Learning function and adjusting operation of the lefty are similar to ones of the righty, and a detailed description is omitted herein for simplicity. The pen-typed navigation device further can acquire and store handwriting of the user via the inertia analysis of the navigation information. The pen-typed navigation device may recognize the user's handwriting while being handled, and the pen-typed navigation device is automatically switched into different operation modes according to analysis of the user's handwriting. In addition, access permission of the handler is verified by the handwriting analysis, the authorized user can freely use the pen-typed navigation device and probably the pen-typed navigation device is switched into the suited operation mode automatically, and someone unauthorized to access the pen-typed navigation device cannot drive functions of the pressure detecting unit and the large DOF optical detecting unit.

The sleep mode mentioned as above represents that the pen-typed navigation device is out of use over a long period of time; for example, the sleep mode may be actuated manually or automatically in the midnight. The pen-typed navigation device analyzes the user's custom to determine when the pen-typed navigation device is employed in drawing in accordance with the known navigation information, and the pen-typed navigation device can be automatically switched into the sleep mode during an unemployed period. Moreover, the sleep mode can be manually actuated by the user, such like clicking the keyswitch unit, rotating the roller unit, and/or swinging the pen-typed navigation device to trigger the movement detecting unit.

The swinging direction and swinging force of the housing on the pen-typed navigation device are discovered by acceleration detecting function of the pen-typed navigation device. Since the pen-typed navigation device is utilized as the briefing pen or the baton, functions of the page turning, video playing and/or video standing can be triggered in accordance with the acceleration variation of the pen-typed navigation device. The pen-typed navigation device may have a directional light source, and the directional light source preferably can be a light emitting diode to project the laser beam onto the projecting screen. The directional light source is matched with the acceleration detecting function to make the pen-typed navigation device be preferably suitable for conference usage. The vibration feedback function of the pen-typed navigation device is utilized to output the reminder command, such as generating the vibration reminder while the slide is changed to the last page or generating the kinesthetic vibration reminder according to the application program executed by the external computer device. Application of the vibration feedback function is not limited the above-mentioned embodiment, which depends on design demand.

In conclusion, the pen-typed navigation device of the present invention utilizes the pressure detecting unit to detect pressure variation of the pen tip, and further drives the large DOF optical detecting unit to detect the movement of the pen tip for optical navigation efficacy. The large DOF optical detecting unit can accurately recognize relative position variation between strokes while writing the letter, so as to provide excellent writing experience in comparison with the conventional optical navigation mouse. The navigation module having the large DOF optical detecting unit and the processing unit can be installed on any optical navigation device according to design demand. The pen-typed navigation device of the present invention which optionally includes the directional light source, the movement detecting unit and the vibration generating unit can be utilized as the briefing pen with the force feedback function, the paint container and/or the writing core are auxiliaries to aid the realistic writing function. Comparing to the prior art, such as the conventional laser baton or the conventional ballpoint pen, the pen-typed navigation device of the present invention has preferred market competition due to multifunctional application.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A pen-typed navigation device comprising:
    a housing;
    a pen tip disposed on an end of the housing;
    a pressure detector disposed on the pen tip and adapted to detect pressure of the pen tip applied to a working surface;
    a large depth of field (DOF) optical detector disposed by the pen tip and having a depth of field (DOF) imaging range, and adapted to detect movement information of the pen tip relative to the working surface while a distance between the pen tip and the working surface is smaller than the DOF imaging range, wherein the DOF imaging range is larger than or equal to one centimeter, and a working distance of the large DOF optical detector is variable within the DOF imaging range so that the large DOF optical detector is actuated to detect the movement information while the pen tip is suspended above the working surface; and
    a processor electrically connected to the pressure detector and the large DOF optical detector, and adapted to acquire navigation information generated by the pen tip according to detection results of the pressure detector and the large DOF optical detector.

2. The pen-typed navigation device of claim 1, wherein a view range of the large DOF optical detector covers the working surface simply, or covers the pen tip and the working surface simultaneously.

3. The pen-typed navigation device of claim 2, wherein the processor is adapted to determine whether the pen tip is moved or inclined relative to the working surface according to the detection result of the large DOF optical detector.

4. The pen-typed navigation device of claim 1, wherein the large DOF optical detector comprises a light source, and a maximum light emitting angle of the light source is equal to 120 degrees.

5. The pen-typed navigation device of claim 1, wherein the large DOF optical detector is detachably disposed by the pen tip.

6. The pen-typed navigation device of claim 1, wherein the pressure detector is switched between an activated mode and a non-activated mode, the pressure detector detects quantity variation of the pressure while being switched into the activated mode.

7. The pen-typed navigation device of claim 1, further comprising:
    a keyswitch unit electrically connected to the processing unit, a part of the keyswitch unit protruding from the housing.

8. The pen-typed navigation device of claim 1, further comprising:
    a roller unit disposed on the housing; and
    a roller detector electrically connected to the processor, and adapted to detect motion of the roller unit so as to trigger a control command different from the navigation information.

9. The pen-typed navigation device of claim 8, wherein the roller detector detects the motion of the roller unit via an optical detecting function, and the roller unit is similar to wheel form or sphere form.

10. The pen-typed navigation device of claim 1, further comprising:
    a movement detector electrically connected to the processor and adapted to detect acceleration variation of the housing.

11. The pen-typed navigation device of claim 10, further comprising:
    a vibration generator electrically connected to the processor and adapted to apply vibration feedback toward the housing according to the acceleration variation.

12. The pen-typed navigation device of claim 10, further comprising:
    an energy supplying unit electrically connected to the processor and detachably disposed inside the housing.

13. The pen-typed navigation device of claim 12, wherein the energy supplying unit collects and stores energy via wireless charge technique or wire charge technique.

14. The pen-typed navigation device of claim 1, wherein the housing is a sheath detachably disposed on a pen-typed object.

15. The pen-typed navigation device of claim 1, wherein the pen tip has an active capacitive touch function or an inactive capacitive touch function.

16. The pen-typed navigation device of claim 1, wherein a paint container is disposed on the pen tip.

17. The pen-typed navigation device of claim 1, further comprising:
    a writing core disposed on the other end of the housing opposite to the pen tip, a paint container being disposed on the writing core.

18. The pen-typed navigation device of claim 1, further comprising:
    at least one writing core, having a paint container; and
    a removable mechanism disposed inside the housing, the pen tip and the at least one writing core being individually disposed on the removable mechanism, the pen tip and the at least one writing core being alternatively pushed out or pulled into the housing by the removable mechanism.

19. The pen-typed navigation device of claim 1, further comprising:
    a memory electrically connected to the processor and adapted to store a related datum of the navigation information, the processor executing inertia analysis of the navigation information according to the related datum.

20. A navigation module for actuating a navigating function according to a command, the navigation module comprising:
    a large depth of field (DOF) optical detector having a depth of field (DOF) imaging range, and adapted to detect movement information of the large DOF optical detector relative to a working surface while a distance between the large DOF optical detector and the working surface is smaller than the DOF imaging range, wherein the DOF imaging range is larger than or equal to one centimeter, and a working distance of the large DOF optical detector is variable within the DOF imaging range so that the large DOF optical detector is actuated to detect the movement information while the large DOF optical detector is suspended above the working surface: and a processor electrically connected to the large DOF optical detector, and adapted to acquire navigation information according to detection results of the large DOF optical detector.

21. The navigation module of claim 20, wherein the processor is adapted to determine whether the large DOF optical detector is moved or inclined relative to the working surface according to the detection result of the large DOF optical detector.

22. The navigation module of claim 20, wherein the large DOF optical detector comprises a light source, and a maximum light emitting angle of the light source is equal to 120 degrees.

* * * * *